United States Patent [19]

Mordick

[11] Patent Number: 5,259,091
[45] Date of Patent: Nov. 9, 1993

[54] HINGE SYSTEM FOR ELECTRICAL ENCLOSURES

[75] Inventor: Brian L. Mordick, Anoka, Minn.
[73] Assignee: Federal-Hoffman, Inc., Anoka, Minn.
[21] Appl. No.: 929,100
[22] Filed: Aug. 13, 1992
[51] Int. Cl.$^5$ .............................................. E05D 7/10
[52] U.S. Cl. .................................... 16/262; 16/254
[58] Field of Search ............... 16/262, 254, 388, 389, 16/392, 382, 384, 386

[56] References Cited

U.S. PATENT DOCUMENTS

| | | | |
|---|---|---|---|
| 2,887,193 | 5/1959 | Sitler | 16/392 |
| 4,704,970 | 11/1987 | Sanderson et al. | 16/389 |
| 4,825,509 | 5/1989 | Mitchell et al. | 16/254 |
| 4,827,568 | 5/1989 | Ramsauer | 16/254 |
| 4,914,781 | 4/1990 | Sokn et al. | 16/388 |
| 5,001,863 | 3/1991 | Uppstrom | 16/384 |

OTHER PUBLICATIONS

"Industrilas ab" brochure (2 pages).
"EMKA" brochure (2 pages).

*Primary Examiner*—Paula A. Bradley
*Assistant Examiner*—Chuck Y. Mah
*Attorney, Agent, or Firm*—Merchant, Gould, Smith, Edell, Welter & Schmidt

[57] ABSTRACT

An electrical enclosure is shown having a cabinet and a door connected by hinges. The hinges comprise door and cabinet components and a removable hinge pin wherein the door component extends through a slot formed in a flange along an edge of the door, and the cabinet component is attached to the cabinet. Locking ramps are provided on the door component which extend through and engage the edges of openings in the door flange on opposite sides of the slot.

7 Claims, 3 Drawing Sheets

HINGE SYSTEM FOR ELECTRICAL ENCLOSURES

FIELD OF THE INVENTION

This invention relates generally to metal electrical enclosures having a cabinet and a door connected by hinges which comprise two cast components and a removable hinge pin wherein one of the hinge components extends through a slot formed in an edge of the door, and more particularly relates to locking ramps on one of the hinge components which extend through and engage openings in the door on opposite sides of the slot to strengthen the door structure and to facilitate positioning and assembly of the hinge component to the door.

BACKGROUND OF THE INVENTION

The electrical enclosures typically have a cabinet made of a metal such as aluminum or steel, or of other materials such as fiberglass or composite plastic, and are provided with a front opening and a door which is connected by hinges to the cabinet. Hinge systems are known wherein one cast, stamped or machined component is connected to the cabinet and the other is connected to the door, wherein the door includes a flat panel and a peripheral flange with a slot extending through the flange into the panel to accommodate one hinge component extending therethrough. A removable hinge pin is provided to connect the two hinge components. In the prior art, one hinge component is bolted or otherwise connected to the cabinet but the door component relies upon the insertion of the hinge pin to hold it in place. Problems encountered with the prior art have included difficulties with accurately positioning the door component of the hinge on the door, keeping the door component in place when the hinge pin is not engaged, and damaging the structural integrity of the door by cutting the slot through both the flange and the adjacent portion of the door panel.

SUMMARY OF THE INVENTION

The present invention provides an improved arrangement for the door component of the hinge system by utilizing locking ramps on the door component which engage corresponding openings in the flange when the door component is mounted to the door. More specifically, a pair of openings are provided in the flange on opposite sides of the slot through which the locking ramps on the door component extend when the door component is placed in position on the door. The locking ramps have flat surfaces which frictionally engage edges of the openings in the flange to strengthen and improve the structural integrity of the door by tieing the flange portions together across the slot. In addition, the locking ramps are designed to ensure the accurate positioning of the door component with respect to the door. Because the locking ramps frictionally engage the edges of the openings, they also temporarily fasten the door component to the door to facilitate assembly and dis-assembly because the door component is less likely to fall off the door when the hinge pin is not engaged.

DESCRIPTION OF THE PREFERRED EMBODIMENT

Figure 1:
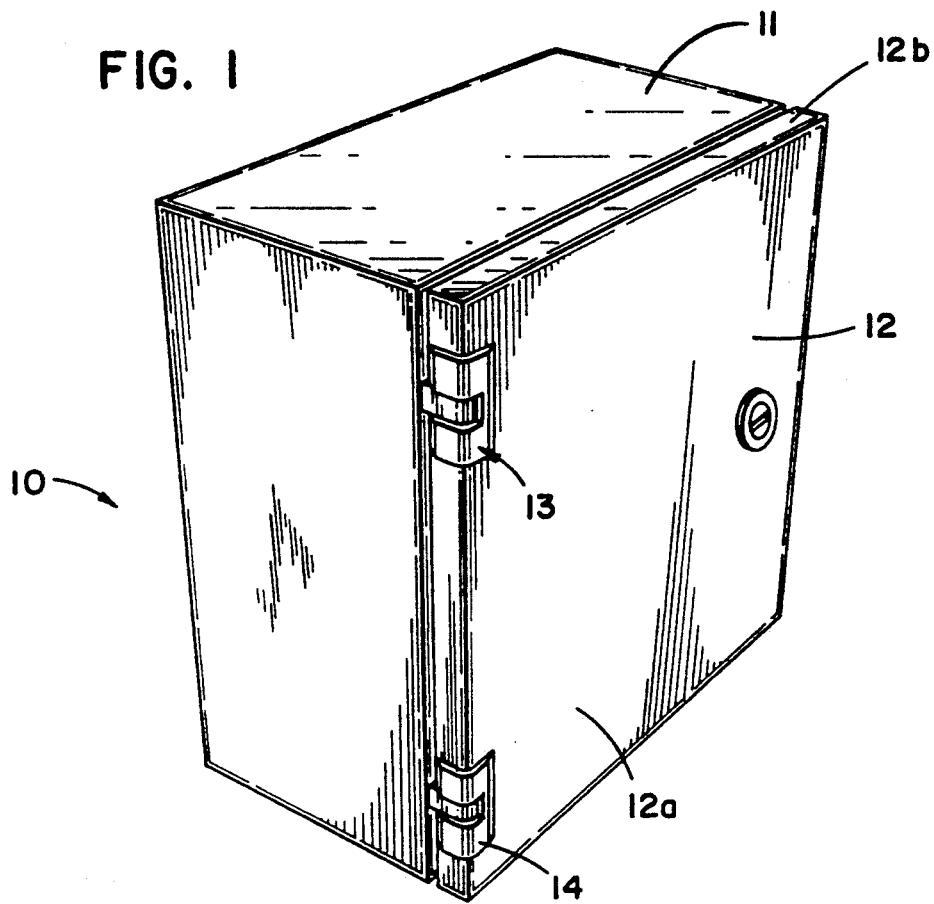
FIG. 1 is a view in perspective of an electrical enclosure having a hinge system constructed according to the present invention.
Figure 2:
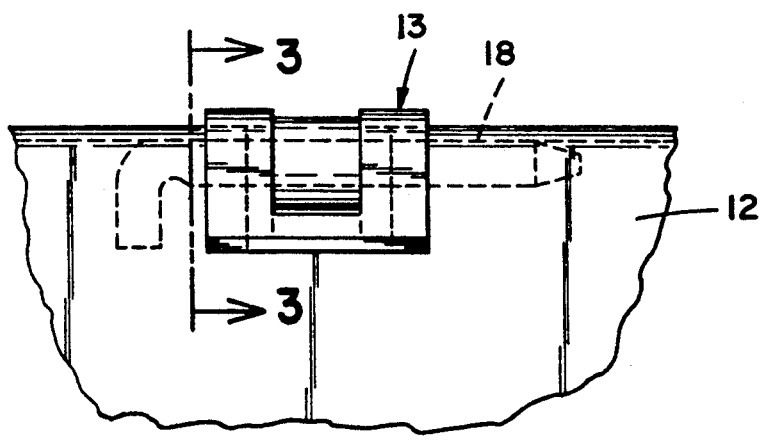
FIG. 2 is an enlarged fragmentary view taken from the front of the enclosure of FIG. 1 showing one hinge and portions thereof in phantom.

Referring now to the drawings wherein like reference numerals are used throughout the several views to identify like elements of the invention, there is disclosed in FIG. 1 an electrical enclosure 10 which includes a metal cabinet 11 and a sheet metal door 12. Door 12 is constructed of a single piece of sheet metal and comprises a rectangular, flat panel 12a surrounded by edges forming a peripheral flange 12b which extends perpendicular to panel 12a. The portions of the flange along each edge of the rectangular panel 12a are welded or otherwise secured together at their ends to form with the panel 12a a relatively shallow box-like structure facing the front opening of cabinet 11. A hinge system comprising a pair of hinges 13 and 14 is provided to connect door 12 to cabinet 11 along one edge of door 12.

Figure 5:
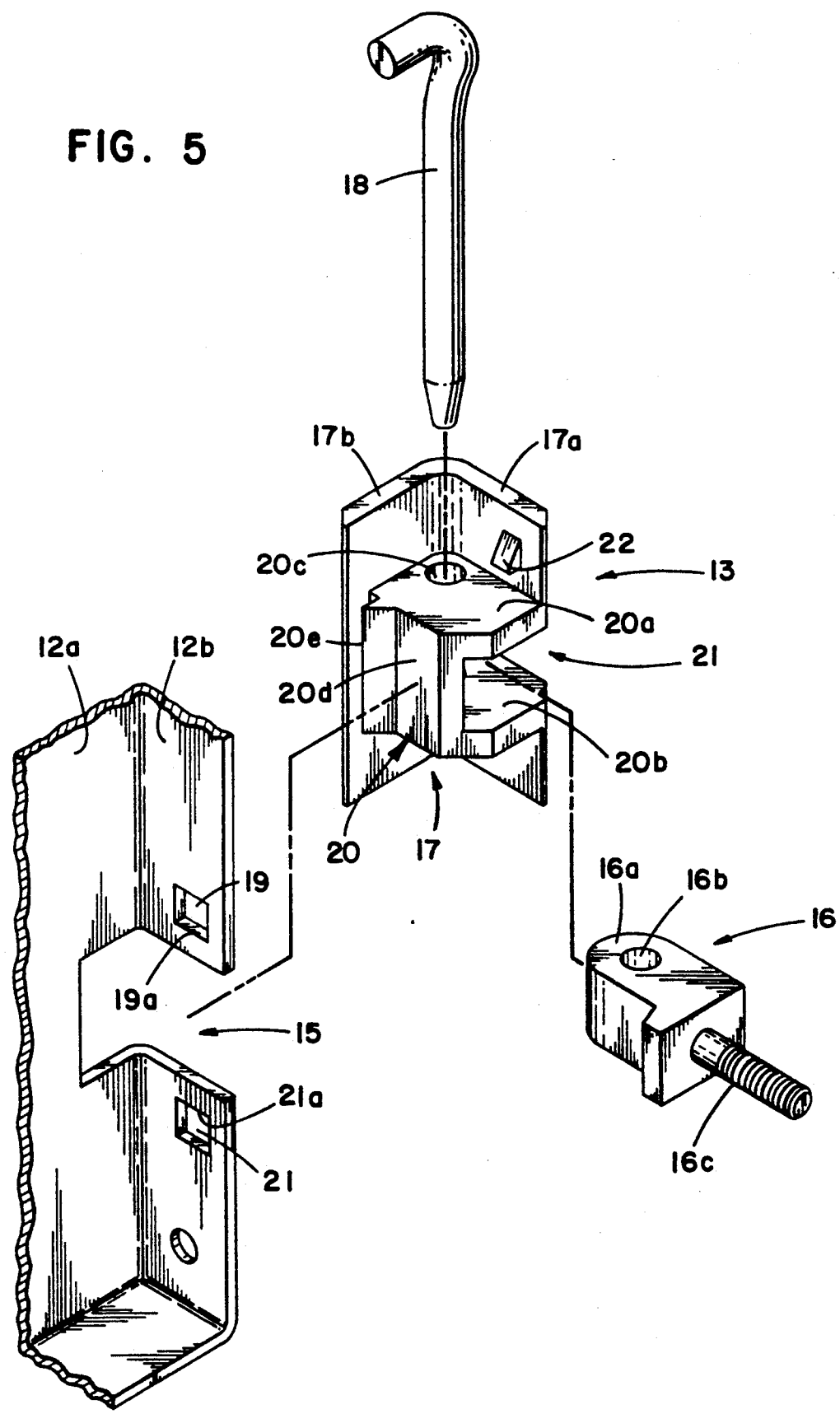
FIG. 5 is a fragmentary exploded view of one hinge and the door for the enclosure.

Referring initially to FIG. 5, there is shown an exploded view of hinge 13, it being understood that hinge 14 has the same construction. To facilitate attachment of hinge 13, door 12 is provided with a rectangular slot 15 which extends through flange 12b and into the adjoining portion of panel 12a. As shown in FIG. 5, the opposite edges of slot 15 are parallel to each other and the end edge of the slot is perpendicular to the side edges.

Figure 3:
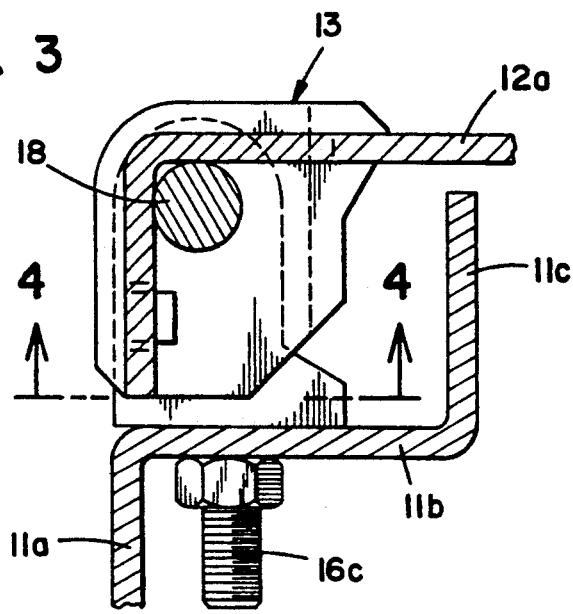
FIG. 3 is a further enlarged fragmentary view taken along line 3—3 of FIG. 2.

Hinge 13 has three parts including a cabinet component 16, a door component 17 and a hinge pin 18. Cabinet component 16 includes a lug member 16a which comprises a hinge knuckle having a bore 16b therethrough and a threaded pin 16c attached to lug member 16a which is used to connect it to cabinet 11. Referring to FIG. 3, it can be seen that cabinet 11 has a side wall portion 11a, a flat forwardly facing frame portion 11b and an outwardly extending sealing flange 11c. A rubber seal (not shown) can be provided between sealing flange 11c and panel 12a to provide a weatherproof seal between the door and the cabinet. Pin 16c extends through an opening in cabinet frame 11b and is connected thereto as shown in FIG. 3. It is noted that cabinet frame portion 11b lies in a plane parallel to door panel 12a so that lug member 16a extends forwardly from the cabinet in the direction of door 12.

Figure 4:
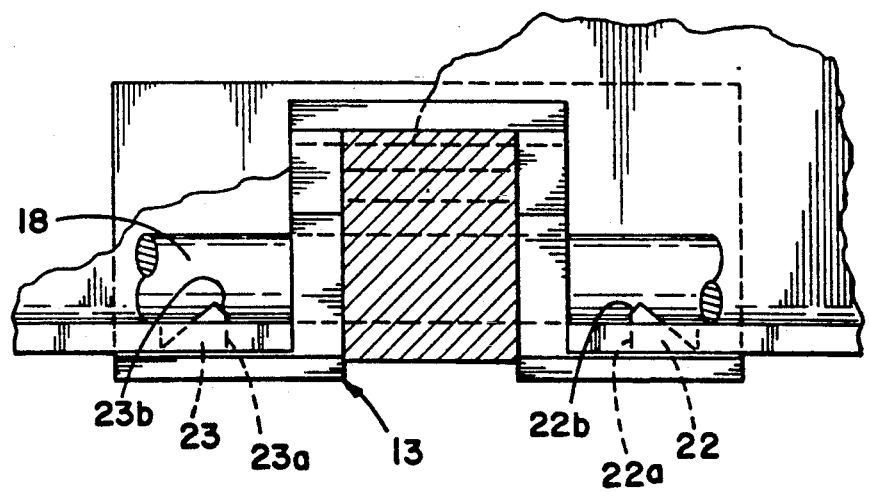
FIG. 4 is a fragmentary sectional view taken along line 4—4 of FIG. 3.

Referring again to the preferred embodiment of FIG. 5, door component 17 includes a metal leaf comprising a first portion 17a and a second portion 17b extending perpendicular thereto. First portion 17a is designed to overlie flange 12b and second portion 17b overlies panel 12a. When door component 17 is mounted on door 12, it covers slot 15 and extends beyond both side edges thereof. Door component 17 further includes a central lug portion 20 having a pair of oppositely disposed side walls 20a and 20b connected between portions 17a, 17b having oppositely facing surfaces spaced apart the same distance as the width of slot 15 so that lug member 20 extends through slot 15 with the opposite walls thereof lightly engaging the edges of slot 15. The side walls of lug portion 20 also define a pair of inwardly facing, spaced walls which cooperate with a slot 21 formed in first portion 17a to define a recess which accommodates lug member 16a as best shown in FIGS. 4 and 5. Lug portion 20 is provided with aligned openings 20c in side walls 20a, 20b which are aligned with opening 16b in door component 16 through which a stainless steel hinge pin 18 can be extended to secure the hinge members 16, 17, together.

Central lug portion 20 is also provided with an inwardly facing wall 20d connecting side walls 20a, 20b opposite from slot 21, and wall 20d is provided with a lip 20e spaced from second portion 17b to form a narrow slot into which the back edge of slot 15 extends when door component 17 is mounted on the door.

Flange 12b is provided with a pair of square openings 19, 21 on opposite sides of slot 15, which are disposed under first portion 17a of door component 17. Door component 17 is provided with a pair of locking ramps 22, 23 on opposite sides of lug portion 20 which are positioned to extend through openings 19, 21 as shown in FIG. 4. Locking ramps 22, 23 are in the nature of protrusions and each has a first flat surface 22a, 23a which lies in a plane perpendicular to the inner surface of first portion 17a so that surfaces 22a, 23a face each other and are spaced to frictionally engage inner edges 2 and 21a of openings 19 and 21. Locking ramps 22, 23 each have a second, oppositely facing surface which slopes away from a tip located between the two surfaces. As shown in FIG. 4, the tips have rounded or flattened surfaces 22b, 23b which extend away from flat surfaces 22a, 23a to facilitate the insertion of the locking ramps into the openings 20 and 21.

It can be seen that when door component 17 is applied to door 12 with lug portion 20 extending through slot 15, the oppositely facing outer walls of lug portion 20 engage the opposite edges of slot 15 to substantially prevent axial movement or twisting of door component 17 with respect to door 12. Locking ramps 22, 23 extend through openings 19, 21 with the flat surfaces thereof frictionally engaging the edges 20a, 21a of the openings. Because flat surfaces 22a, 23a are parallel to each other and because edges 19a, 21a are also parallel and similarly spaced, door component 17 is automatically positioned in the proper place with respect to door 12. This facilitates assembly because the openings 16b and 20c. will thus be automatically aligned so that pin 18 can be easily inserted. Also, locking ramps 22, 23 provide for temporary fastening of door component 17 to door 12, thus facilitating assembly and dis-assembly of the enclosure. Without the locking ramps frictionally engaging the edges of the openings, door component 17 would be more likely to fall off the door when the hinge pin 18 is not engaged. Finally, locking ramps 22, 23 substantially improve the structural integrity of the door because they tie together the portions of flange 12b which are disposed on opposite sides of slot 15 to significantly improve the strength of the flange. As a result, there is less potential for flexing of flange 12b resulting in less undesirable twisting or misalignment of the door with respect to the cabinet.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A cabinet, a door, a hinge apparatus for removably attaching said door to said cabinet wherein said door comprises a rectangular panel having edges forming a peripheral flange extending perpendicular to said panel, comprising:
   (a) a pair of hinges connecting said flange along one edge of said door to said cabinet, said door having a rectangular slot extending through said flange into said panel for each said hinge;
   (b) each said hinge comprising:
      (i) a lug member comprising a knuckle having a bore therethrough and means for attaching said lug member to said cabinet,
      (ii) a metal leaf having a first portion overlying said flange, a second portion perpendicular thereto overlying said panel, and a central lug portion extending through said slot, said lug portion having a pair of walls spaced to accommodate said lug member therebetween, and openings in said walls aligned with said bore, and
      (iii) a hinge pin extending through said aligned openings and bore;
   (c) said flange having openings formed therethrough on opposite sides of each said slot under said first portion, and
   (d) each said first portion having protrusions thereon extending through said corresponding openings in said flange constructed and arranged to cooperate with said openings to strengthen said flange.

2. Hinge apparatus according to claim 1 wherein said openings in said flange for each said slot have side edges adjacent said slot, and wherein said corresponding protrusions have first surfaces extending generally perpendicular to said first portion which engage said edges.

3. Hinge apparatus according to claim 2 wherein each said protrusion has a second surface sloping away from a tip between said first and second surfaces and wherein said tip is rounded away from said first surface to facilitate inserting said protrusions into said corresponding openings.

4. A cabinet, a door, and hinge apparatus for removably attaching said door to said cabinet wherein said door comprises a panel having at least one edge forming a flange extending generally perpendicular to aid panel, comprising:
   (a) a hinge for connecting said flange to said cabinet, comprising:
      (i) a lug member and means for attaching said lug member to said cabinet,
      (ii) a leaf having a first portion overlying said flange, a second portion overlying said panel, and a central lug portion extending through a slot in said flange and being constructed and arranged to accommodate said lug member,
      (iii) aligned openings in said lug member and said lug portion; and
      (iv) a hinge pin extending through said openings;
   (b) one of said flange and said first portion having openings formed therethrough on opposite sides of said slot and lug portion; and
   (c) the other of said first portion and flange having protrusions thereon extending through said corresponding openings constructed and arranged to cooperate with said openings to strengthen said flange.

5. Hinge apparatus according to claim 4 wherein said slot extends through said flange and into said panel, wherein said protrusions are on said first portion and wherein said corresponding openings are in said flange.

6. Hinge apparatus according to claim 5 wherein said openings in said flange have side edges adjacent said slot, and wherein said corresponding protrusions have first surfaces extending generally perpendicular to said first portion which engage said side edges.

7. Hinge apparatus according to claim 6 wherein each said protrusion has a second surface sloping away from a tip between said first and second surfaces and wherein said tip is rounded away from said first surface to facilitate inserting said protrusions into said corresponding openings.

* * * * *

UNITED STATES PATENT AND TRADEMARK OFFICE
CERTIFICATE OF CORRECTION

PATENT NO. : 5,259,091

DATED : November 9, 1993

INVENTOR(S) : Brian L. Mordick

It is certified that error appears in the above-identified patent and that said Letters Patent is hereby corrected as shown below:

In column 3, line 27, "2" should read --19a--.

In column 3, line 33, "20" should read --19--.

In column 3, line 41, "20a" should read --19a--.

In column 4, line 5, "a" should read --and--.

In column 4, line 49, "aid" should read --said--.

Signed and Sealed this

Eighth Day of November, 1994

Attest:

BRUCE LEHMAN

Attesting Officer

Commissioner of Patents and Trademarks